Nov. 8, 1966 E. P. KOLLAR ETAL 3,283,432
FILM RECORD CARDS AND METHOD FOR MAKING SAME
Filed June 23, 1964 6 Sheets-Sheet 1

INVENTOR
ERNEST P. KOLLAR
DONALD W. CHANDLER
BY
AGENT

Nov. 8, 1966 E. P. KOLLAR ETAL 3,283,432
FILM RECORD CARDS AND METHOD FOR MAKING SAME
Filed June 23, 1964 6 Sheets-Sheet 4

Nov. 8, 1966   E. P. KOLLAR ETAL   3,283,432
FILM RECORD CARDS AND METHOD FOR MAKING SAME
Filed June 23, 1964   6 Sheets-Sheet 6
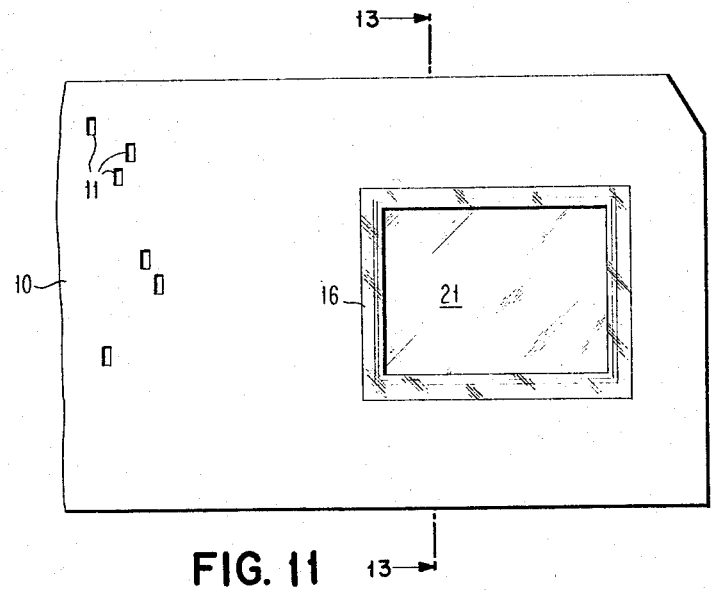
FIG. 11
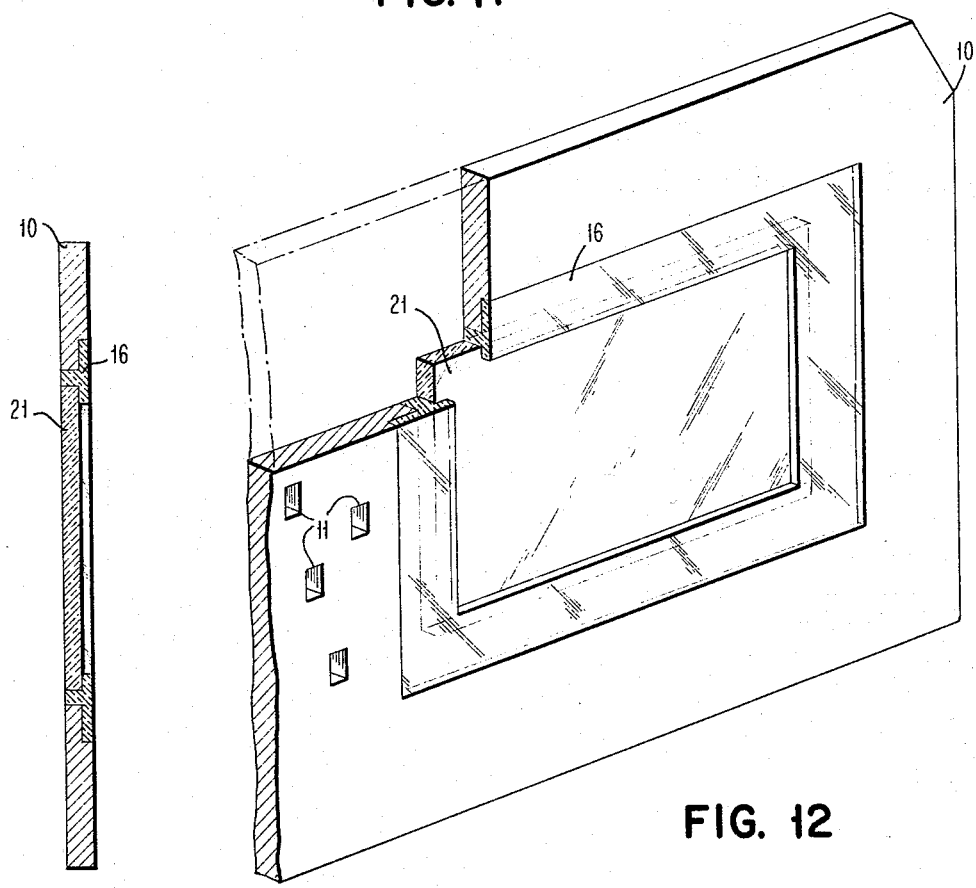
FIG. 12
FIG. 13

United States Patent Office 3,283,432
Patented Nov. 8, 1966

3,283,432
FILM RECORD CARDS AND METHOD FOR MAKING SAME
Ernest P. Kollar, Vestal, and Donald W. Chandler, Binghamton, N.Y., assignors to International Business Machines Corporation, New York, N.Y., a corporation of New York
Filed June 23, 1964, Ser. No. 377,211
9 Claims. (Cl. 40—158)

This invention relates to film record cards in which individual microfilm sections are mounted and the method of making the same.

It is well known to mount film sections or other transparencies for filing, projecting and other purposes by employing a card having an aperture therein to receive the film section, and adhesively securing said film section to a transparent or opaque adhesive coated sheet which is secured to one surface of the card and extends across the aperture. In the case of an opaque adhesive sheet the latter is provided with an opening smaller than the card aperture to expose a portion of the film section and permit light to be transmitted therethrough. It also has been proposed to utilize a card having an aperture therein and an embossed recess in one surface thereof surrounding said aperture, in which recess the film or adhesive sheet may be placed and secured so that the outer surface of said film or sheet is even with or slightly below the surface of the card.

The use of mounting sheets has been necessitated by the fact that no portion of the mounted film insert should project beyond the card on either side so that the cards may pass through record controlled machines without the film inserts getting caught and torn loose coupled with the fact that the thickness of the cards commonly used in card handling machines is only .007 inch while the thickness of the film may vary from the thickness of diazo film which is approximately .003 inch to the silver halide film thickness of .005 to .0055 inch. Additionally, allowance must be made to take care of the thickness of the adhesive substance used to secure the film. It can be seen then that for straight-forward mounting of a silver halide film insert onto an adhesive coated shoulder, it becomes necessary to compress the cardstock surrounding the aperture to a depth of .006 inch leaving a shoulder of .001 inch thickness. As a practical matter, it has been found that it is impossible to compress the present standard cardstock, which has a basis weight of 99 pounds per 3000 square feet and a thickness of approximately .007 inch, to a depth sufficient for the insertion of film having a thickness of at least .0025 inch without deforming or pushing out the reverse side of the card. This is because the density of the compressed portion would then exceed the density of solid cellulose.

In view of this major problem relative to the compressibility of cardstock, as was mentioned, use has been made of an apertured mounting sheet of pressure sensitive or heat sensitive adhesive material secured to a compressed shoulder surrounding the card aperture, which shoulder need only have a depth of approximately .0015 inch. A narrow section of the sheet extends into the aperture with exposed adhesive thereon for subsequent mounting of a transparency in the aperture which has a depth of .0055 inch. However, it was found that these prior mounts have the disadvantages that they are expensive and difficult to manufacture and require expensive machinery. Additionally, they are a prepared mount requiring the user to stock a quantity of the same for subsequent use and to be dependent upon the supplier. Also, where a pressure sensitive adhesive is used it became necessary to use a temporary protective cover sheet which had to be removed prior to mounting the film, thus burdening the customer with an added step to perform and additional expense. In an attempt to eliminate the need for using separate mounting sheets, proposals have been made whereby the film insert is secured wholly within the card aperture without the aid of an adhesive coated sheet or an embossed recess in the card. The film insert is positioned centrally between the opposite plane surfaces of the card and an adhesive substance is confined wholly within the aperture and bonds the peripheral edge of the film to the peripheral edge of the aperture. The main difficulty encountered with this type of card is that it utilizes an insufficient bonding area and the film insert subsequently becomes loose. Other proposals have suggested the use of a card having an unshouldered aperture with the periphery of the aperture provided with notches filled with an adhesive substance which is caused to flow and bond a film insert positioned in the aperture. Here again, it was found that an insufficient bonding area was used and the film insert was not effectively held.

In overcoming the shortcomings of the above prior art, the present novel card not only eliminates the use of a separate mounting sheet but it also employs a novel method of bonding the film insert wholly within the card aperture whereby a greater area of adhesive bond is provided which results in the film insert being held much more securely. In addition, the present card provides a much more satisfactory card from the standpoint that it may be supplied to the customer and very satisfactorily machine processed prior to the customer mounting the film insert himself if he so desires. In the preferred embodiment, the card is provided with a ground recess or trench having a depth of approximately .0015 inch in one surface of the card surrounding the predetermined area of the card that is to be apertured out. A series of elongated unconnected slits are punched out of the bottom of the trench, the slits being narrower in width than the trench and extending around the area of the card to be apertured. Then a polymer substance such as a hot melt adhesive, thermoset or thermoplastic is applied to the trench such that it fills the trench and the punched out slits to form a molded closed-loop frame having a T-shaped cross-section. The frame is confined between the planes of the opposite surfaces of the card. At this stage the card may be shipped directly to the customer for machine processing and film mounting or the card may be completed with the film inserted prior to shipment. The card at this point is particularly adapted for machine processing by the customer since there are no protruding elements of any kind and there are no exposed punched out areas which would have to be avoided by the sensing means of card handling machines. In preparation for mounting a film insert, a suitable perforating device is employed to punch out the cardstock joining the ends of the elongated slits and also to punch out the predetermined area of cardstock which is enclosed by the inner edges of the elongated slits. Due to the configuration of the slits, there remain portions of the molded polymer which extend partially over the card aperture and to which the film insert is bonded through the use of heat and pressure. Application of a heated platen die will melt the polymer and effect a bond which extends over the ground shoulder and the edge portions of the film insert, and also down into the space between the peripheral edge of the card aperture and the peripheral edge of the film to very effectively secure the film insert within the card aperture and between the opposite plane surfaces of the card. Since the resulting card aperture has a depth of approximately .0055 inch, from the bottom of the ground trench to the opposite face of the card, all of the desired types of diazo and silver halide films can be mounted and confined between the opposite plane surfaces of the card.

Accordingly, a principal object of the present invention is to provide a novel and improved card of the type described wherein a film insert is secured between the opposite plane surfaces of the card without the necessity of using and aperturing an adhesive coated mounting sheet.

A further object of the present invention is to provide a novel and improved method for producing film record cards of the type set forth above, which method involves grinding and slitting a trench and molding therein an adhesive frame which surrounds a predetermined card area to be apertured.

A still further object of the present invention is to provide a novel and improved card of the type described wherein the card is devoid of any protruding elements or openings which would have to be temporarily covered to facilitate machine processing prior to mounting the film insert.

The foregoing and other objects, features and advantages of the invention will be apparent from the following more particular description of the invention, as illustrated in the accompanying drawings.

In the drawings:

FIG. 11 is a plan view of the card of FIG. 9 with a film insert bonded thereto.

FIG. 12 is a fragmentary perspective view of the card of FIG. 11.

FIG. 13 is a sectional view taken on line 13—13 of FIG. 11.

Figure 1:
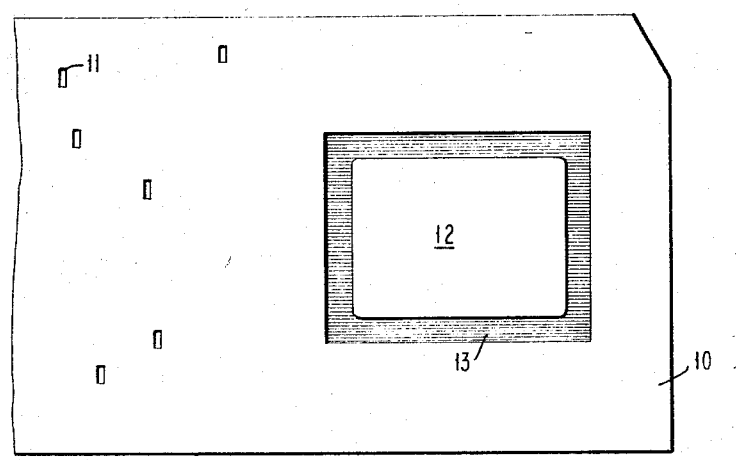
FIG. 1 is a plan view showing a portion of a record card provided with a ground trench surrounding the area of the card to be apertured.
Figure 2:
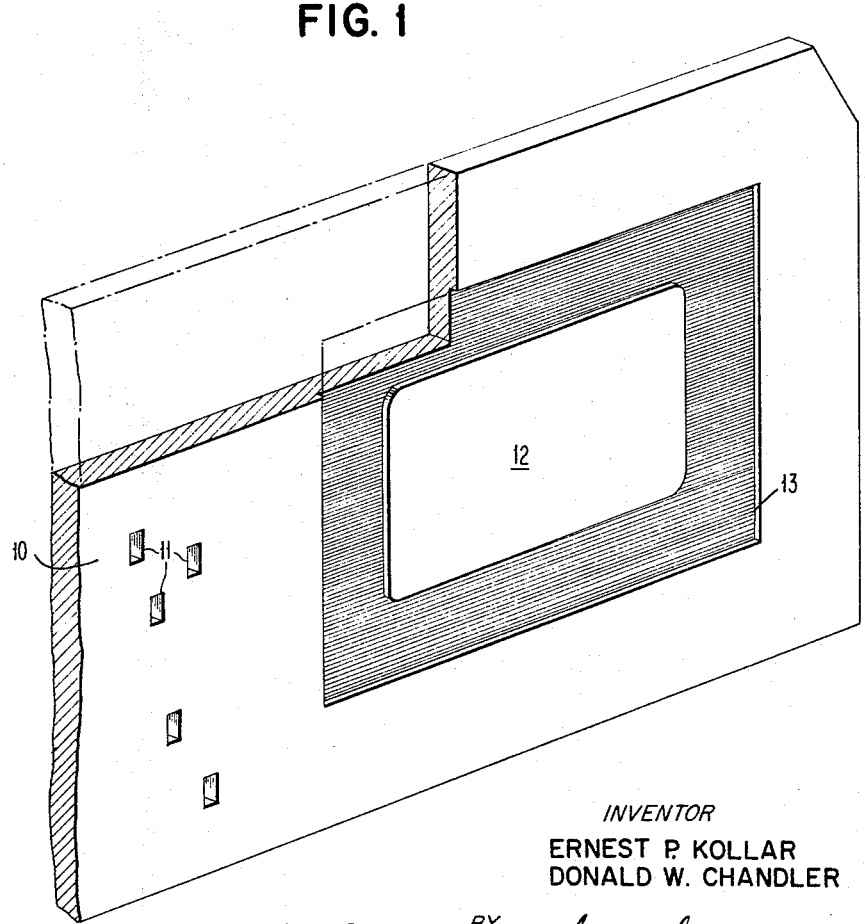
FIG. 2 is a fragmentary perspective view of the card of FIG. 1.
Figure 10:
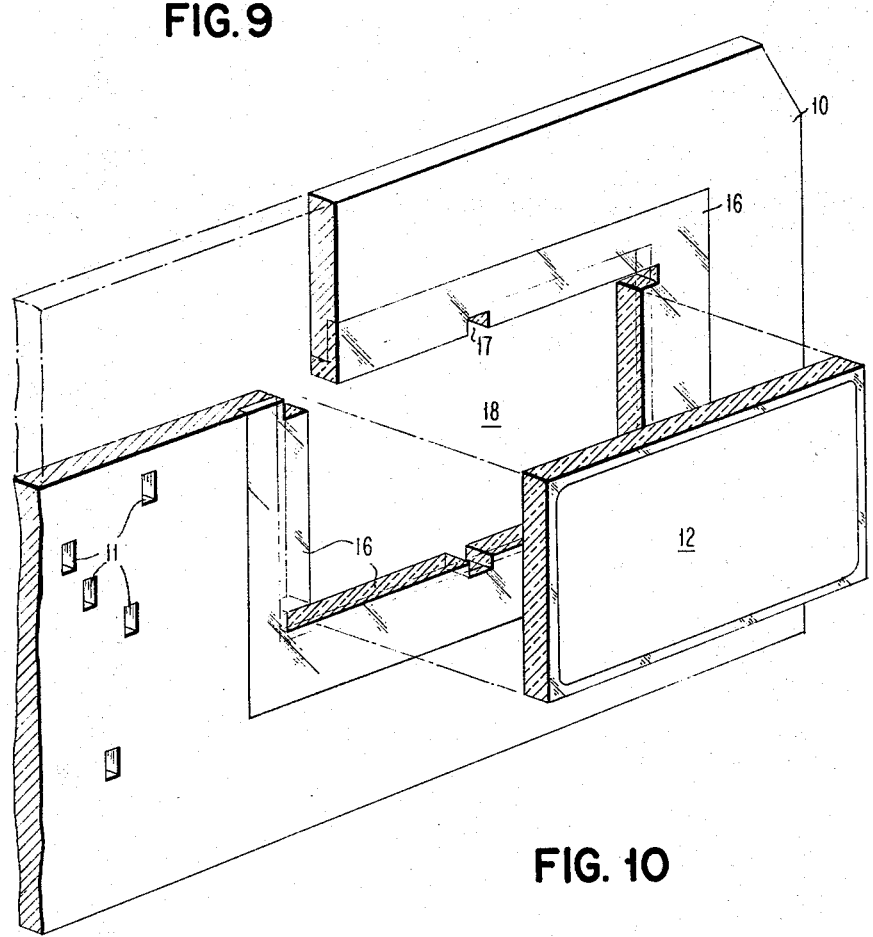
FIG. 10 is a fragmentary perspective view of the card of FIG. 9.

Referring to FIGS. 1 and 2, 10 indicates an oblong single ply record card of the IBM type which is formed of cardboard or heavy relatively stiff paper material having a thickness of approximately .007 inch and which may be of the same shape and size in all dimensions as the cards commonly employed in connection with known statistical, tabulating and record card sorting systems and machines. The card is punched as indicated at 11 with information or data relating to the film to be ultimately carried or mounted in an aperture in the card. In a predetermined location at the right-hand side of the card is a generally rectangular area or core 12 which is to be ultimately apertured out to receive a film insert and the first step in carrying out the present invention is to grind in one face of the card a groove or trench 13 around the area 12. The trench is preferably ground to a depth of from .001 to .0015 inch through the use of a high speed grinding wheel coacting against a backup die provided with a raised pattern having the same configuration as the trench or area to be ground. Grinding mechanism of this type for grinding cards is known in the art and is shown, for example, in the Langan et al. Patent No. 3,103,756.

As illustrated in FIG. 2, the core 12 is left with a surrounding strip of thinner cardstock having a thickness of from .0055 to .006 inch corresponding to the maximum thickness of the film to be mounted.

Figure 3:
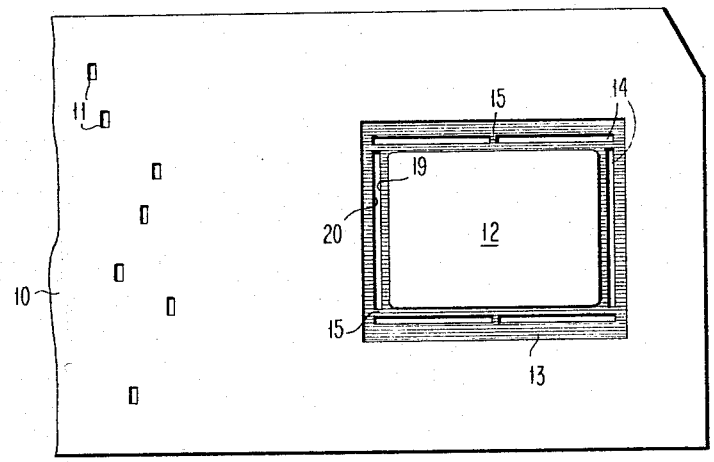
FIG. 3 is a plan view of the card of FIG. 1 further provided with elongated slits around the bottom of the trench.
Figure 4:
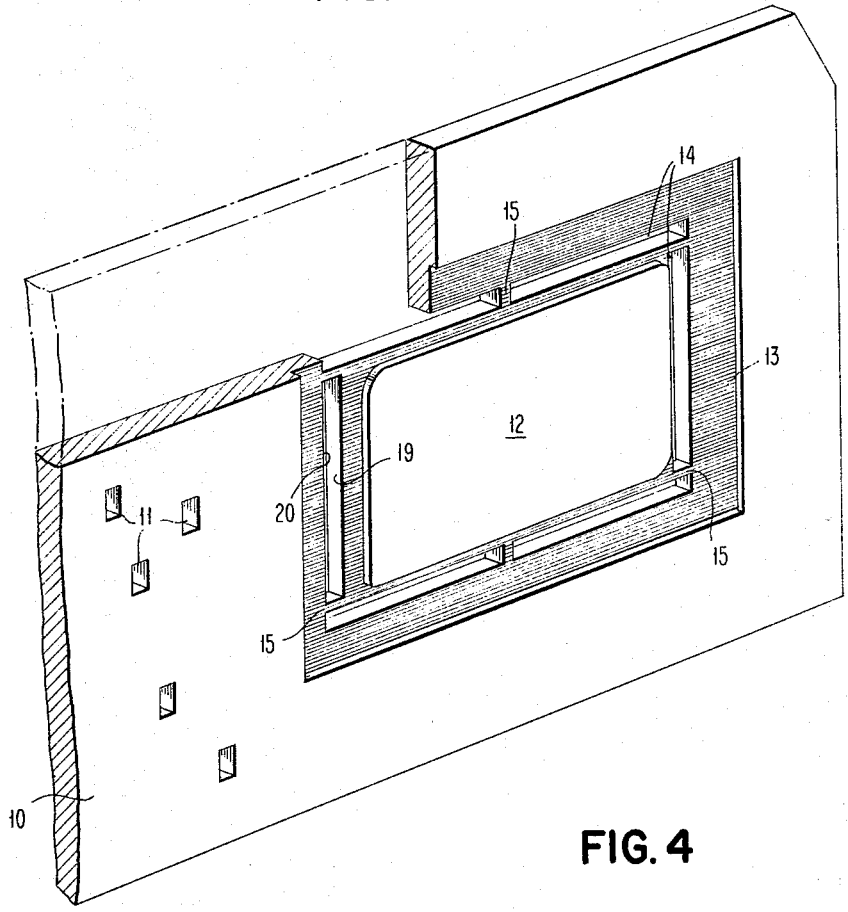
FIG. 4 is a fragmentary perspective view of the card of FIG. 3.

Referring to FIGS. 3 and 4, the next step involves the cutting of a series of interrupted elongated slits 14 around the bottom of the trench 13. The slits communicate with the opposite face of the card and preferably have a rectangular configuration which runs parallel to the sides of the core area 12 and the perimeter of the ground trench. The slits may be cut by any suitable punch and die mechanism and the slits should be spaced inwardly from the outside perimeter of the trench such that a recessed ledge or shoulder may be formed to which the film may be bonded in a manner to be described. Bridges of cardstock 15 between the slits maintain the core area intact with the card.

Figure 5:
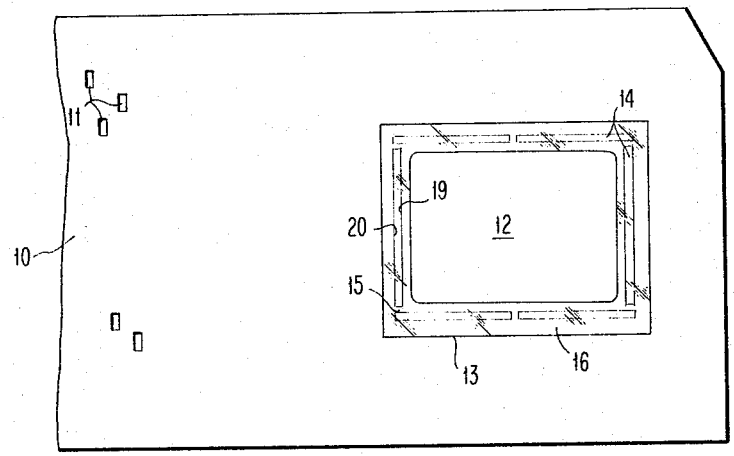
FIG. 5 is a plan view of the card of FIG. 3 further provided with a molded polymer adhesive frame.
Figure 6:
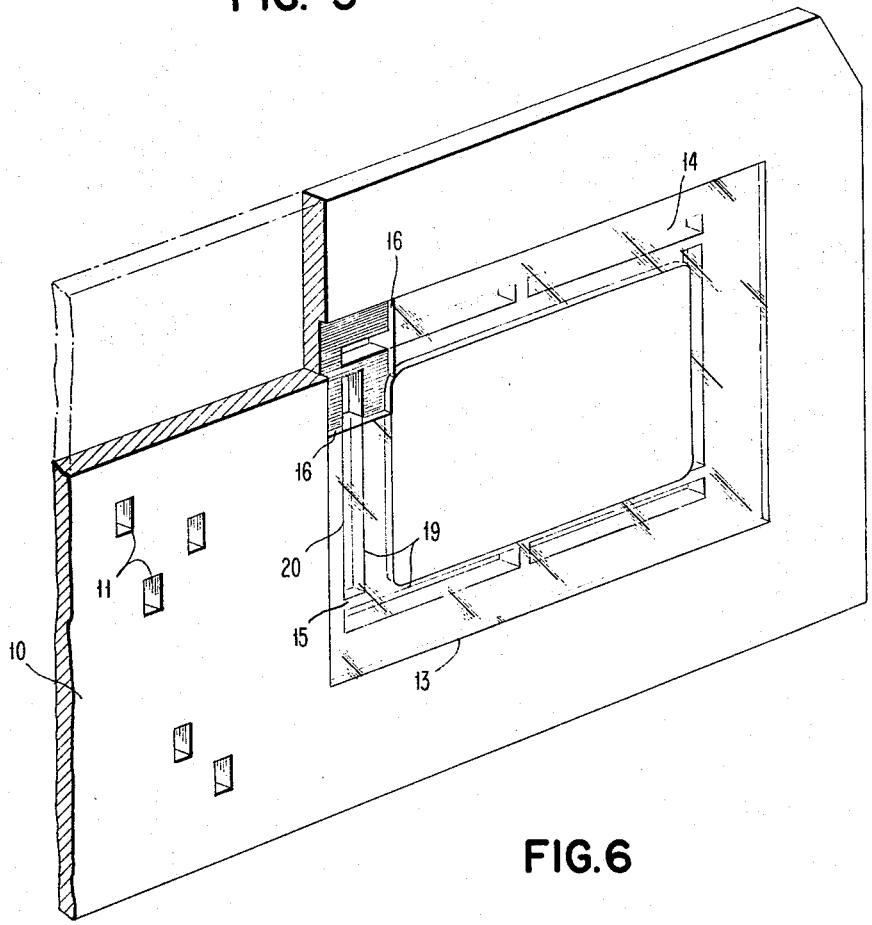
FIG. 6 is a fragmentary perspective view of the card of FIG. 5.

As shown in FIGS. 5 and 6, after cutting of the slits the trench 13 and slits 14 are filled with a suitable hot melt adhesive or polymer material 16. The polymer material 16 may be any suitable thermo-forming plastic material having adhesive qualities which will melt and flow upon the application of heat and which will set or harden upon removal of the heat. Examples of polymers which may be easily molded and which will provide an excellent bonding material for holding the film insert are: polyethylene, polypropylene, polyamides, polyacetates, phenoxy, polyvinyl alcohol, polyvinyl chloride, polyvinyl acetate and other copolymers. The polymer may be suitably applied by spray, gravure cylinder, roll applicator, or the like, or a polymer bead or frame may be sliced from preformed chunks and placed around the trench or it may be formed around the trench by nozzle means. The melting temperature may fall in the range of from 200 to 400 degrees F. The polymer material may be either transparent or opaque and is preferably allowed to fill both the trench and the slits to form, in effect, a rectangular frame each leg of which has a T-shaped cross-section. The frame of polymer material is confined between the opposite plane surfaces of the card. If it is desired not to fill the slits with polymer, a suitable backup die having plugs for filling the slits may be used when the polymer is applied.

The card as shown in FIGS. 5 and 6 is in condition to be shipped to those customers which desire to machine process the cards and mount their own film inserts as part of their information retrieval system. It will be noted that there are no elements protruding from either surface of the card, no cover sheets which might be torn loose and no openings in the card other than the data perforations 11 which are to be sensed. The polymer material, of course, prevents electrical sensing from occurring through the slits 14. As a result, the card lends itself perfectly to machine processing by the customer prior to film mounting.

Figure 7:
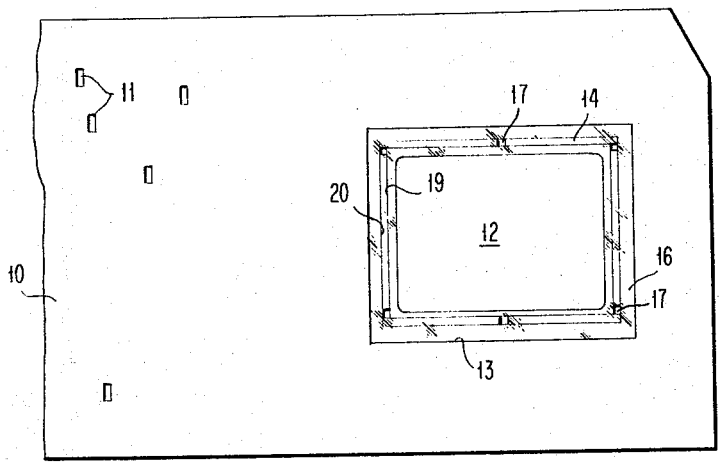
FIG. 7 is a plan view of the card of FIG. 5 with the cardstock separating the elongated slits removed.
Figure 8:
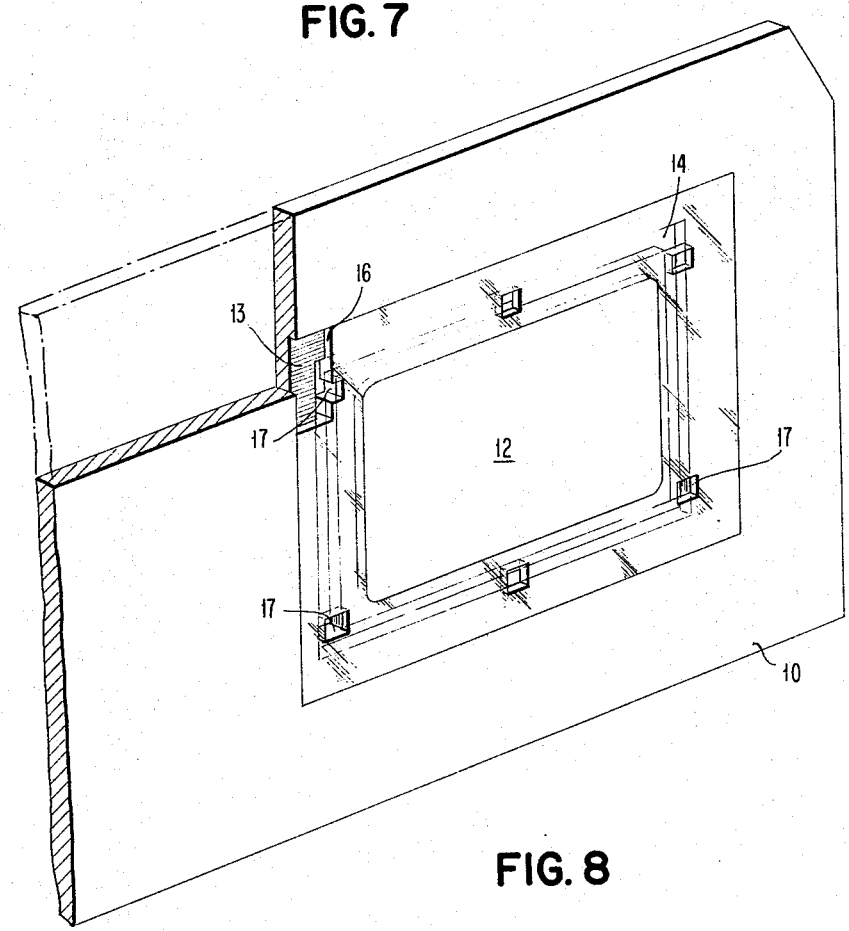
FIG. 8 is a fragmentary perspective view of the card of FIG 7.
Figure 9:
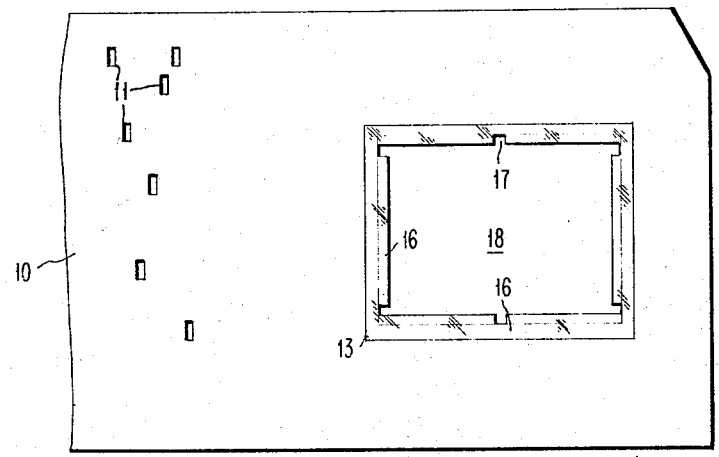
FIG. 9 is a plan view of the card of FIG. 7 with the predetermined area of the card surrounded by the slits removed.

When it is desired to mount a film piece the next step, as illustrated in FIGS. 7 and 8, is to punch out the cardstock bridges 15 between the slits thus forming the through holes 17, as shown. At this point, the core area 12 remains intact with the card by virtue of the polymer material 16. The punching may be effected by any suitable punch and die structure. After the removal of the bridge portions, the central core area 12 and part of the polymer coated ground trench 13 is punched out to provide the card aperture 18 as shown in FIGS. 9 and 10. A suitable punch and die structure for forming the aperture is shown in the aforementioned U.S. Patent No. 3,103,756 and it will be understood that such a punch structure could be easily modified to punch both the openings 17 and the aperture 18 in one operation, if desired. As shown, the dimensions of the punch and die are such that the cut is made through the polymer coated trench along the inner edges 19 of elongated slits 14. As a result of cutting along the inner edges of the slits, it can be seen that the central core area 12 is removed and the cardstock aperture, in effect, takes the dimension defined by the outer edges 20 of the slits 14 with the polymer material 16 which fills the slits extending into the aperture, as shown in FIG. 9, to form a ledge or shoulder to which a film insert may be bonded.

Having thus formed the aperture, the desired section of film 21 is bonded over the aperture and to the polymer material by positioning the card on a backup support and using a suitable heated pressure platen similar to the one illustrated in the Langan Patent No. 2,859,550. As shown in FIG. 12, the film insert 21 has the same shape as the aperture but is slightly smaller in size. The emulsion side of the film is positioned against the portions of the polymer frame which extend into the aperture and the polymer is caused to flow onto the edge portions on one side of the film and trench as well as through the space between the peripheral edge of the film and the peripheral edge of the card aperture so that the film is bonded by a rectangular frame each leg of which has a T-shaped cross-section. For bonding, the temperature may fall in the range of from 200 to 400 degrees F. and the pressure may vary from 20 to 600 p.s.i. The resulting bond securely retains the film insert between the opposite plane surfaces of the card and insures that the card may be repetitively processed through machines without coming apart or hindering the machine.

The present method of forming the film record card not only provides an extremely satisfactory card for machine processing prior to film mounting but it also lends itself to the use by the customer of a single film mounting device wherein the operations of card aperturing and film bonding may be carried out in simple fashion. Additionally, the present method is adapted to be carried out on high speed rotary equipment where it is desired to have the manufacturer make the completely assembled card prior to shipment. The cardstock bridges 15 may, if desired, be removed prior to customer shipment. Reactivation of the polymer under heat and pressure will cause lateral flow of hot melt into the voids caused by bridge removal.

While the invention has been particularly shown and described with reference to a preferred embodiment thereof, it will be understood by those skilled in the art that various changes in form and details may be made therein without departing from the spirit and scope of the invention.

What is claimed is:

1. A record card for use in film record card systems comprising:
    a card having a predetermined area which is to be apertured out;
    a trench formed in one face of the card and surrounding said predetermined area;
    a series of interrupted elongated slits disposed around the bottom of said trench; and
    a polymer substance filling said trench and elongated slits to provide a T-shaped recessed frame to which a film insert may be bonded after aperturing out said predetermined area.

2. A record card as set forth in claim 1 wherein said polymer frame lies between the opposite plane surfaces of the card.

3. A record card for use in film record card systems comprising:
    a card having a predetermined area which is to be apertured out;
    a trench formed in one face of the card and surrounding said predetermined area;
    a series of interrupted elongated slits disposed around the bottom of said trench, said slits defining the perimeter of said area to be apertured out; and
    a polymer substance filling said trench and elongated slits to provide a T-shaped recess frame to which a film insert may be bonded after aperturing out said predetermined area.

4. A record card for use in film record card systems comprising:
    a card having a predetermined area which is to be apertured out;
    a trench formed in one face of the card and surrounding said predetermined area;
    a series of interrupted elongated slits disposed around the bottom of said trench, said slits having a width which is less than the width of the trench with the inner periphery of the slits defining the perimeter of said area to be apertured out; and
    a polymer substance filling said trench and elongated slits to provide a T-shaped recessed frame bonded to said card and having edge portions to which a film insert may be bonded after aperturing out said predetermined area.

5. A record card for use in film record card systems comprising:
    a card having a predetermined area which is to be apertured out, said area being smaller than the area of a film insert to be bonded to said card;
    a trench formed in one face of the card and surrounding said predetermined area;
    a series of interrupted elongated slits disposed around the bottom of said trench and spaced inwardly from the edges thereof, said slits having a width which is less than the width of the trench with the inner periphery of the slits defining the perimeter of said area to be apertured out; and
    a polymer substance filling said trench and elongated slits to provide a T-shaped recessed frame bonded to said card and having edge portions to which a film insert which is larger than said predetermined area may be bonded after aperturing out said area.

6. A record card for use in film record card systems comprising:
    a card having a predetermined rectangular area which is to be apertured out;
    a rectangular trench formed in one face of the card and surrounding said predetermined area;
    a series of interrupted elongated rectangular slits disposed around the bottom of said trench and spaced inwardly from the edges thereof, said slits having a width which is less than the width of the trench with the inner periphery of the slits defining the perimeter of said area to be apertured out; and
    a polymer substance filling said trench and elongated slits to provide a recessed rectangular frame bonded to said card, each leg of said frame having a T-shaped cross-section, and said frame having edge portions to which a rectangular film insert may be bonded after aperturing out said predetermined area.

7. The method of making a film record card for use in card record systems which comprises:
    forming a trench in one face of the card which surrounds a predetermined area of the card to be apertured out;
    cutting a series of interrupted elongated slits around the bottom of said trench;
    filling said trench and slits with a polymer substance;
    removing the card and polymer connections between said slits;
    removing that portion of the card which is defined by the inner periphery of said series of slits to provide an aperture surrounded by a polymer frame having edge portions which extend partially into said aperture; and
    positioning a film insert in said aperture and bonding same to the edge portions of said polymer frame.

8. The method of making a film record card for use in card record systems which comprises:
    forming a trench in one face of the card which surrounds a predetermined area of the card to be apertured out;

cutting a series of interrupted elongated slits around the bottom of said trench, said slits being spaced from the edges thereof and having a width less than the width of the trench;

filling said trench and slits with a polymer substance to form a polymer frame surrounding said predetermined area;

removing the polymer and card material connecting said slits;

removing that portion of the card which is defined by the inner periphery of said series of slits to provide an aperture surrounded by a polymer frame having edge portions which extend partially into said aperture; and positioning a film insert in said aperture and heat and pressure bonding same to the edge portions of said polymer frame.

9. The method of making a film record card for use in card record systems which comprises:

forming a rectangular trench in one face of the card which surrounds a predetermined area of the card to be apertured out;

cutting a series of interrupted elongated rectangular slits around the bottom of said trench, said slits being spaced from the edges thereof and having a width less than the width of the trench;

filling said trench and slits with a hot melt polymer substance to form a rectangular polymer frame surrounding said predetermined area, each leg of said frame having a T-shaped cross-section;

removing the polymer and card material connecting the ends of said slits;

removing that portion of the card which is defined by the inner periphery of said series of slits to provide an aperture surrounded by said polymer frame, said frame having edge portions which extend partially into said aperture; and positioning a film insert in said aperture and heat and pressure bonding same to the edge portions of said polymer frame.

References Cited by the Examiner

UNITED STATES PATENTS

| | | | |
|---|---|---|---|
| 2,587,022 | 2/1952 | Langan | 156—108 |
| 2,612,711 | 10/1952 | Baker | 40—158 |
| 2,984,921 | 5/1961 | Herzig | 40—158 |
| 3,025,623 | 3/1962 | Hunt | 40—158 |
| 3,072,024 | 1/1963 | Wengel | 40—158 X |
| 3,212,206 | 10/1965 | Langan | 40—158 |

EUGENE R. CAPOZIO, *Primary Examiner.*

W. J. CONTRERAS, *Assistant Examiner.*